(12) United States Patent
Aten

(10) Patent No.: US 9,650,992 B2
(45) Date of Patent: May 16, 2017

(54) CORE COWL THRUST REVERSER SYSTEM AND APPARATUS

(71) Applicant: ROHR, INC., Chula Vista, CA (US)

(72) Inventor: Michael Aten, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 538 days.

(21) Appl. No.: 14/056,772

(22) Filed: Oct. 17, 2013

(65) Prior Publication Data

US 2015/0107224 A1 Apr. 23, 2015

(51) Int. Cl.
| F02K 1/68 | (2006.01) |
| F02K 1/74 | (2006.01) |
| F02K 1/70 | (2006.01) |

(52) U.S. Cl.
CPC ............. F02K 1/70 (2013.01); F02K 1/68 (2013.01); F02K 1/74 (2013.01); *Y02T 50/671* (2013.01)

(58) Field of Classification Search
CPC . F02K 1/72; F02K 1/763; F02K 1/766; F02K 1/60; F02K 1/605; F02K 1/70; F02K 1/64; F02K 1/68; F02K 1/62; F02K 1/625
See application file for complete search history.

(56) References Cited

U.S. PATENT DOCUMENTS

| 3,262,269 A * | 7/1966 | Kutney | B64C 11/001 239/265.19 |
| 3,279,181 A * | 10/1966 | Beavers | F02K 1/68 60/226.2 |
| 3,280,561 A * | 10/1966 | Kutney | F02K 1/68 239/265.19 |
| 3,353,355 A * | 11/1967 | Jordan | F02K 1/68 239/265.43 |
| 3,622,075 A * | 11/1971 | Harris | F02K 1/18 239/265.19 |
| 4,073,440 A * | 2/1978 | Hapke | F02K 1/74 239/265.29 |
| 4,216,923 A | 8/1980 | Harris | |
| 5,040,730 A * | 8/1991 | Hogie | F02K 1/70 239/265.23 |
| 5,852,928 A * | 12/1998 | Vauchel | F02K 1/68 239/265.29 |
| 5,893,265 A * | 4/1999 | Gonidec | F02K 1/70 239/265.33 |
| 2005/0151012 A1 | 7/2005 | Lair | |
| 2008/0072570 A1* | 3/2008 | Lair | F02K 1/60 60/226.2 |

FOREIGN PATENT DOCUMENTS

FR 2964704 3/2012

* cited by examiner

*Primary Examiner* — Gerald L Sung
*Assistant Examiner* — Rene Ford
(74) *Attorney, Agent, or Firm* — Snell & Wilmer L.L.P.

(57) ABSTRACT

A thrust reverser system deployable from a core cowl is provided. The thrust reverser system may comprise one or more doors that are configured to overlap to reduce leakage and increate reverse thrust while deployed. The doors may be configured to vanes that are configured to split and/or direct airflow.

19 Claims, 9 Drawing Sheets

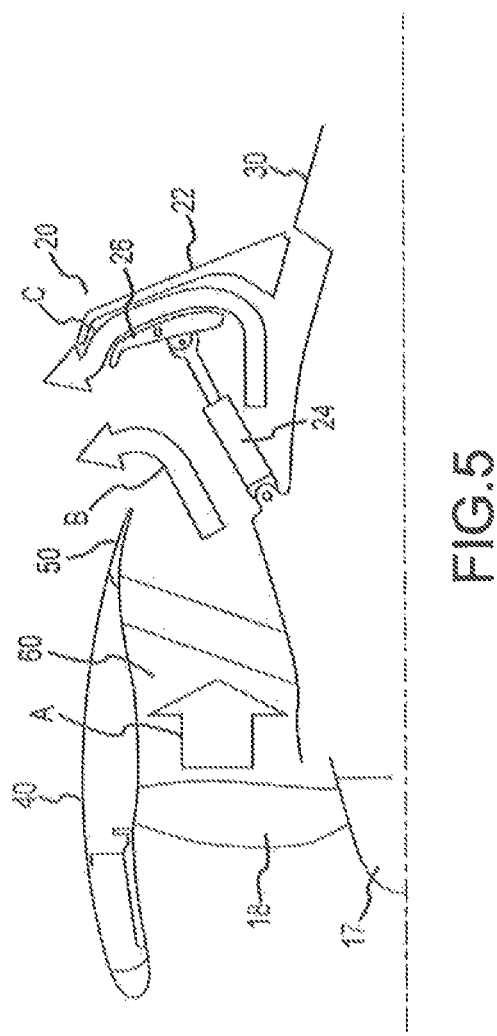

CORE COWL THRUST REVERSER SYSTEM AND APPARATUS

FIELD

The present disclosure relates to thrust reversers, and more specifically, to thrust reversers that are deployable from an engine core cowl.

BACKGROUND

Typical aircraft engines and/or nacelles generally comprise a thrust reverser system. The thrust reverser system may be configured to provide reverse thrust to slow the aircraft during a landing event (e.g., after touchdown) by at least partially redirecting the flow of air in the bypass air duct in the forward direction of the aircraft, However, known thrust reverser systems may decrease the overall aerodynamic efficiency of the aircraft in order to provide the reverse thrust capability.

SUMMARY

In various embodiments, a thrust reverser system may comprise a first door, a second door and a first vane. The first door may be deployable from a core cowl. The second door may be adjacent the first door. The second door may be deployable from the core cowl. The first vane may be installed on the first door. The first vane may be configured to direct air in response to the thrust reverser system being activated.

In various embodiments, a propulsion system may comprise a fan cowl, a fan, an engine and a core cowl. The fan may be disposed within the fan cowl. The engine core may be configured to drive the fan. The core cowl may be disposed within the fan cowl and may be configured to surround at least a portion of the engine core. The core cowl may comprise a first door and a second door. The first door may be deployable from the core cowl. The second door may be deployable form the core cowl. The second door may be adjacent the first door. The second door may be configured to overlap at least a portion of the first door when deployed.

In various embodiments, a thrust reverser system may comprise a core cowl, a first plurality of doors, and a second plurality of doors. The first plurality of doors may be installed about a first radius of the core cowl. The second plurality of doors may he installed about a second radius of the core cowl aft the first radius. The second plurality of doors may be configured to overlap the first plurality of doors to minimize leakage of the thrust reverser system.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 5 illustrates a cross-sectional view of a portion of aircraft propulsion system comprising a thrust reverser, in accordance with various embodiments.

DETAILED DESCRIPTION

Figure 1:
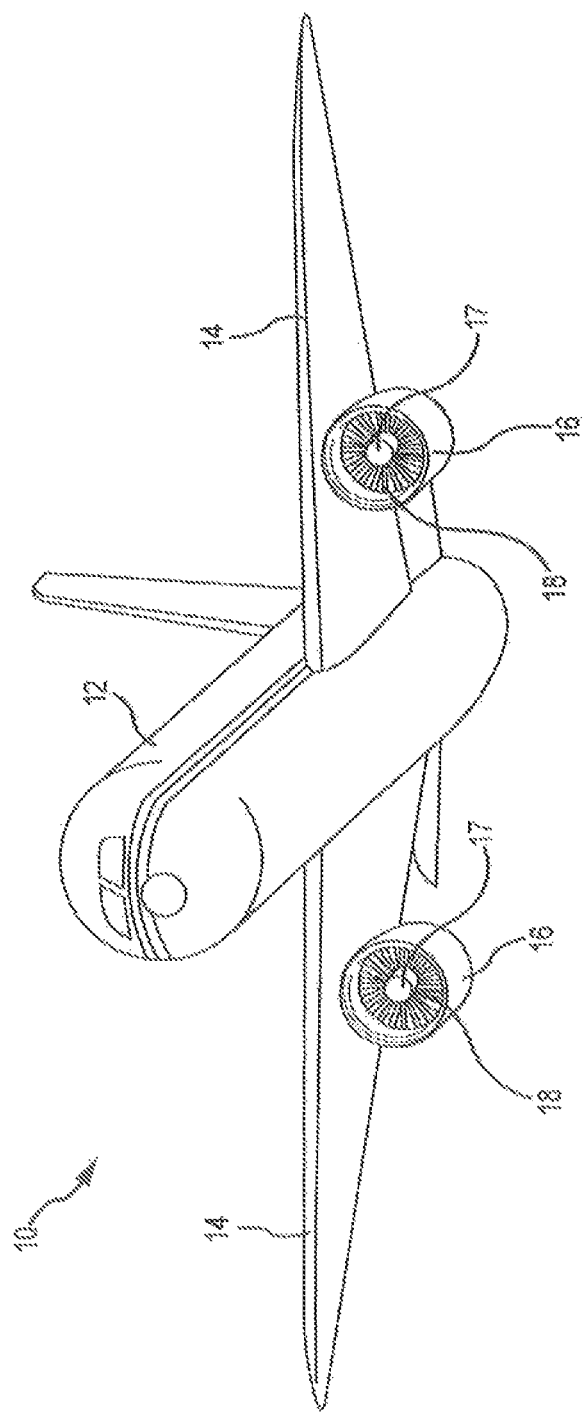
FIG. 1 is illustrates a perspective view of an aircraft, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented fur purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact, Furthermore, any reference to singular includes plural embodiments, and any reference to more than one component or step may include a singular embodiment or step, Surface shading lines may be used throughout the figures to denote different parts but not necessarily to denote the same or different materials.

As used herein, "aft" refers to the direction associated with the tail (e.g., the hack end) of an aircraft, or generally, to the direction of exhaust of the gas turbine. As used herein, "forward" refers to the direction associated with the nose (e.g., the front end) of an aircraft, or generally, to the direction of flight or motion.

Recent times have seen the size of commercial jet aircraft engines increase over older designs. More specifically, the fans of commercial jet aircraft engines are increasing to provide greater bypass ratios, As the diameters of engines grow, the drag and weight of the propulsion system (e.g., nacelle and engine) may also increases. In order to accommodate larger engines, it may be desirable to change the design of thrust reversers. In this regard, the design of the thrust reverser may be changes to reduce overall weight and aerodynamic inefficiency.

In various embodiments, the thrust reverser systems described herein may comprise one or more doors that are deployable from a core cowl. In this regard, the doors may be formed as a portion of the core cowl and/or as a portion of the exterior surface of the core cowl, More specifically, the doors may be deployed into the airstream (e.g., into the free airstream aft of the bypass air duct) at of and/or in the exhaust path of the bypass air duct. In this regard, the doors may be capable of diverting and/or directed air exhausted from the bypass air duct to create a reverse thrust. The doors may be deployable in response to an aircraft landing event and/or a wheel touchdown. These doors may be deployable with any suitable deployment mechanism. These doors may also comprise aerodynamic elements such as vanes and/or airfoils that are configured to help direct the airflow at least partially forward to provide reverse thrust.

In various embodiments and with reference to FIG. 1, an aircraft 10 may comprise a fuselage 12 and a pair of wings 14, Propulsion system 16 (e.g., turbofan jet engine with a nacelle assembly) may be mounted on the underside of wing 14. Propulsion system 16 may comprise a fan 18 and an engine core 17. Engine core 17 may be configured to drive the fan 18 and provide forward thrust and/or propulsion for aircraft 10.

Figure 2:
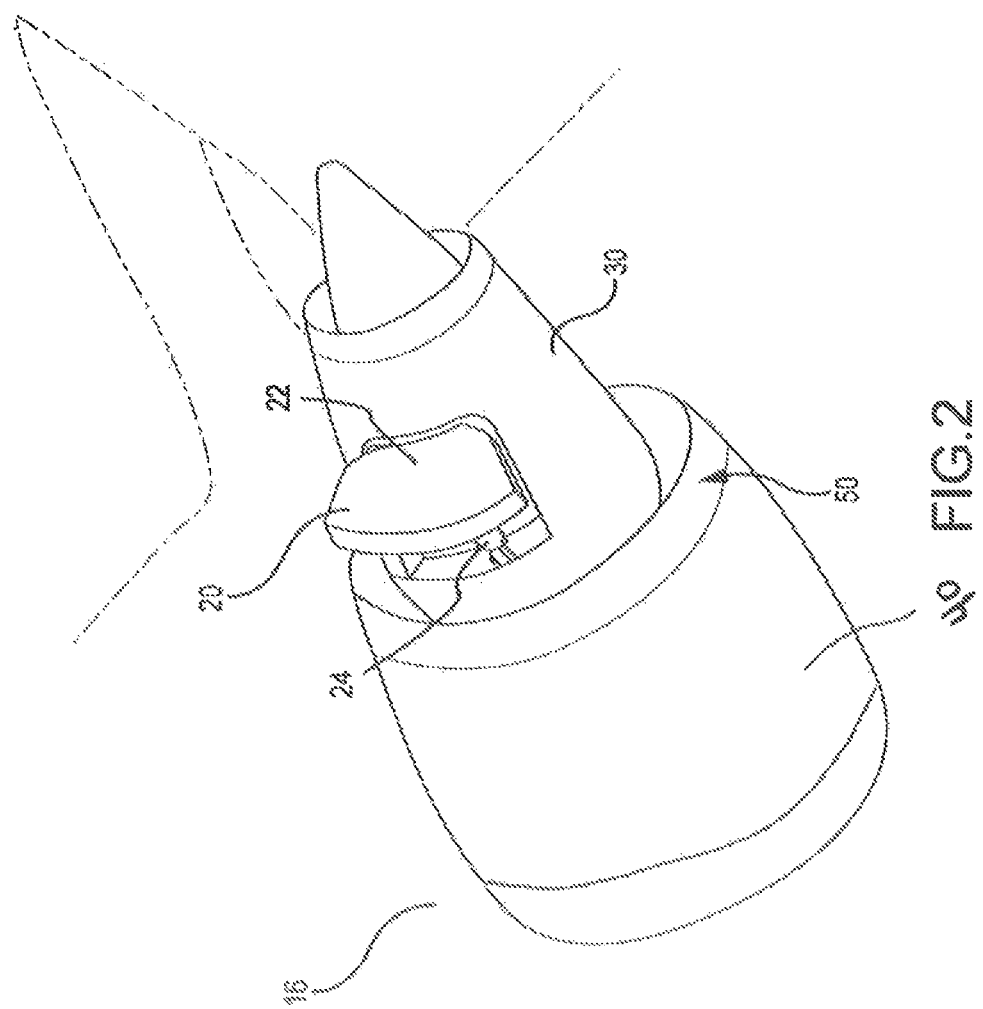
FIG. 2 illustrates a bottom perspective view of an aircraft propulsion system comprising a thrust reverser, in accordance with various embodiments.

In various embodiments and with reference to FIG. 2, propulsion system 16 may further comprise a fan cowl 40 and a core cowl 30. Radially inside of fan cowl 40 may be situated a fan case surrounding the fan and hub. The fan case and the engine case may define a bypass air duct. Air propelled through the bypass air duct may exit from the end of the fan case to generate forward thrust. Optionally, the bypass air duct may terminate at a variable area fan nozzle 50 ("VAIN 50"). In this regard, the aft portion of the nacelle generally refers to the direction associated with the exhaust from propulsion system 16 and/or engine core 17. In various embodiments, core cowl 30 may further comprise a thrust reverser system 20.

In various embodiments, thrust reverser system 20 may comprise one or more doors 22 and one or more actuation system 24 (e.g., a deployment mechanism). Door 22 may be formed on and/or installed on an outer surface of core cowl 30. During operation, when no reverser thrust is requested (e.g., during flight and/or take-off), door 22 may be stowed on core cowl 30. In this regard, door 22 may not obstruct (or minimal obstruction of) airflow and/or create drag or reverse thrust. Door 22 may form a substantially smooth outer surface of core cowl 30 in its stowed configuration.

During operation, when reverser thrust is requested (e.g., when the thrust reverser system is activated during a landing event after wheel touchdown), door 22 may be deployed to create drag and/or reverse thrust. Door 22 may be actuated from the stowed position to the deployed position by actuation system 24. The deployed position of door 22 extends radially outward from core cowl 30. Air from the bypass air duct may be diverted and/or directed by door 22 to create revere thrust. More specifically, VAN 50 may conduct and/or direct air exhausted all through fan cowl 40 to thrust reverser system 20 and/or door 22 when door 22 is in a deployed position.

Figure 3:
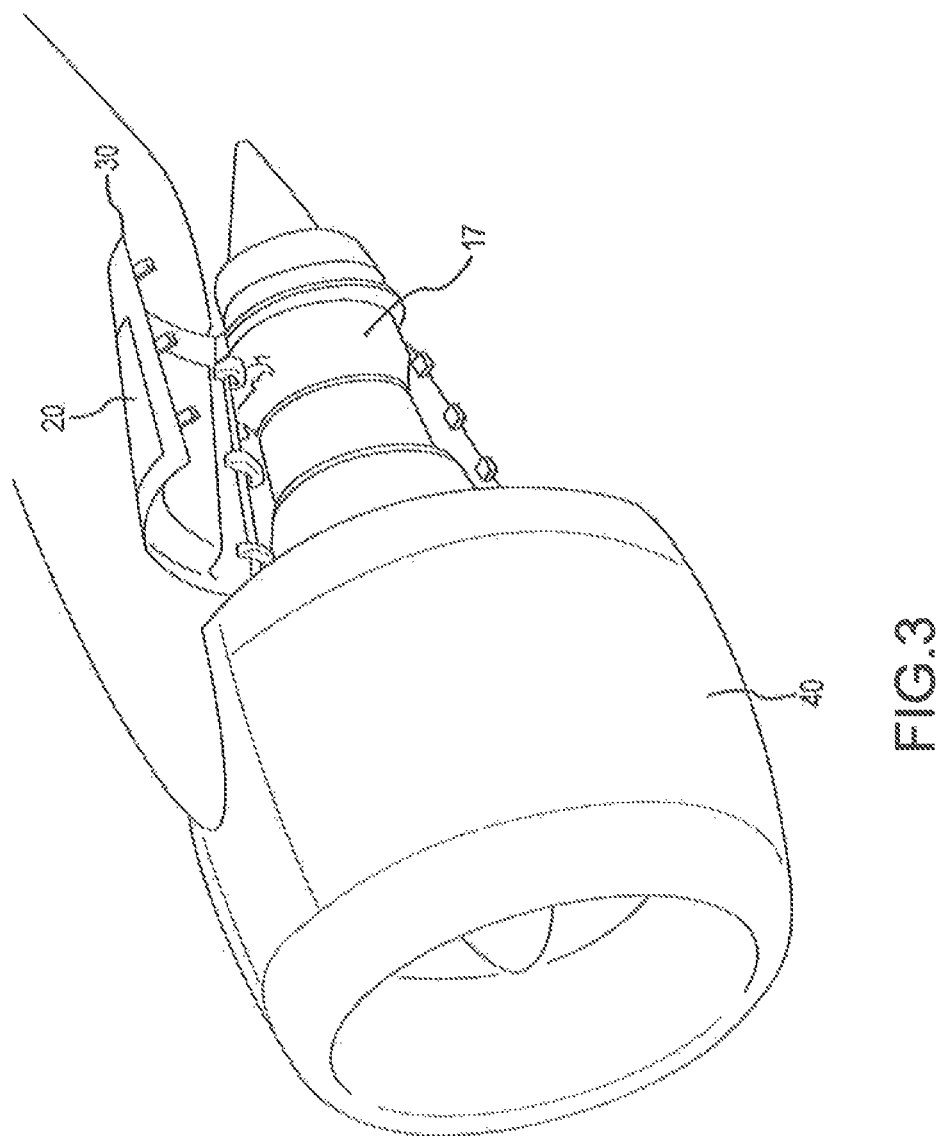
FIG. 3 illustrates a side perspective view of an aircraft propulsion system comprising a thrust reverser, in accordance with various embodiments.
Figure 4:
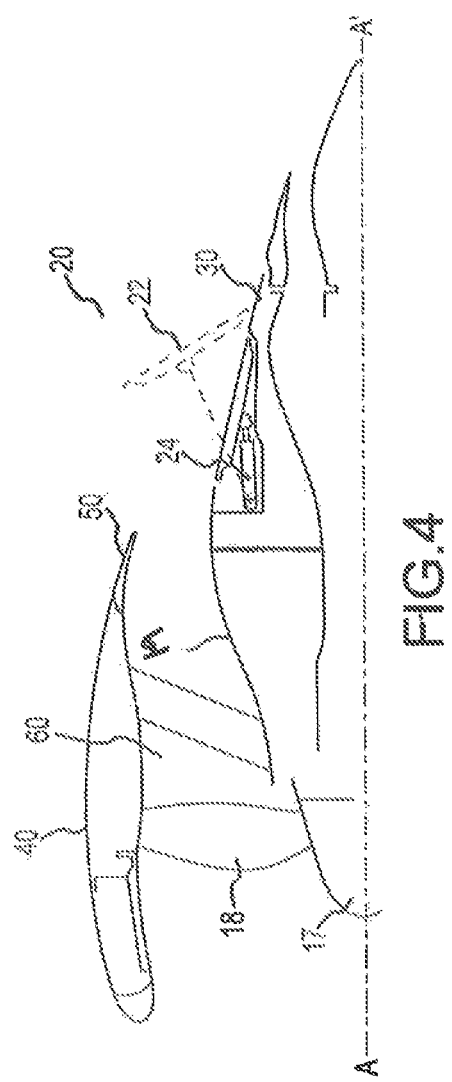
FIG. 4 illustrates a cross-sectional view of a portion of aircraft propulsion system comprising a thrust reverser, in accordance with various embodiments.

In various embodiments, and with reference to FIG. 3, core cowl 30 of propulsion system 16 may be hinged to a support structure and/or portion of the engine pylon. In this regard, core cowl 30 may open to provide for inspection of engine core 17 and/or other components of propulsion system 16. Moreover, by including thrust reverser system 20 as a portion of core cowl 30, the overall length of fan cowl 40 and/or the nacelle increasing the overall aerodynamic efficiency of fan cowl 40 and/or the nacelle In various embodiments, and with reference to FIG. 4, thrust reverser system 20 may comprise a door 22 and an actuation system 24. Actuation system 24 may be any suitable deployment mechanism including, for example, a linear actuator, a rack and pinion gear system, a hydraulic actuator, an electric actuator, and/or any other suitable actuation or deployment mechanism.

In various embodiments, during propulsion system 16 operation, engine core 17 may drive and/or rotate fan 18 about centerline A-A'. Fan 18 may create and/or drive airflow aft through bypass air duct 60 (e.g., an engine fan air duct, bypass duct, and/or the like). Bypass air duct 60 may be a channel defined between an engine case 19 and/or core cowl 30 and the fan case and/or fan cowl 40. The air driven by fan 18 through bypass air duct 60 and/or the exhaust area of bypass air duct 60 (e.g., the area between the aft portion of fan cowl 40 and core cowl 30) may be affected and/or controlled by VAN 50. In this regard, VAN 50 may constrict the aft area associated with bypass air duct 60 and/or direct airflow from fan 18 to the thrust reverser system 20. The airflow may be conducted to doors 22 when the thrust reverser is deployed during a landing event.

In various embodiments, and with reference to FIG. 5, airflow A may be driven between fan cowl 40 and core cowl 30 (e.g., through bypass air duct 60). Airflow A may be exhausted aft of fan cowl 40 and VAN 50 and may be directed to thrust reverser system 20. In various embodiments, thrust reverser system 20 may comprise door 22 and a vane 26 (e.g., an airfoil, wing, fairing, blade and/or the like). Door 22 and vane 26 may be deployable by actuation system 24. Vane 26 may be installed adjacent to door 22. For example, vane 26 may be coupled to, installed on, and/or integrally formed with door 22. Vane 26 may be any suitable size or shape. For example, vane 26 may comprise aerodynamic surfaces or be shaped in any suitable fashion to control and/or direct airflow.

In various embodiments, vane 26 may be configured to split and/or divert or direct a portion of airflow A. More specifically, vane 26 may be configured to split and direct airflow A into airflow B and airflow C. In this regard, vane 26 may divert airflow B and airflow C in a forward direction to create reverse thrust. Moreover, vane 26 may be configured to divert airflow B and airflow C away from particular aircraft surfaces.

Figure 6A:
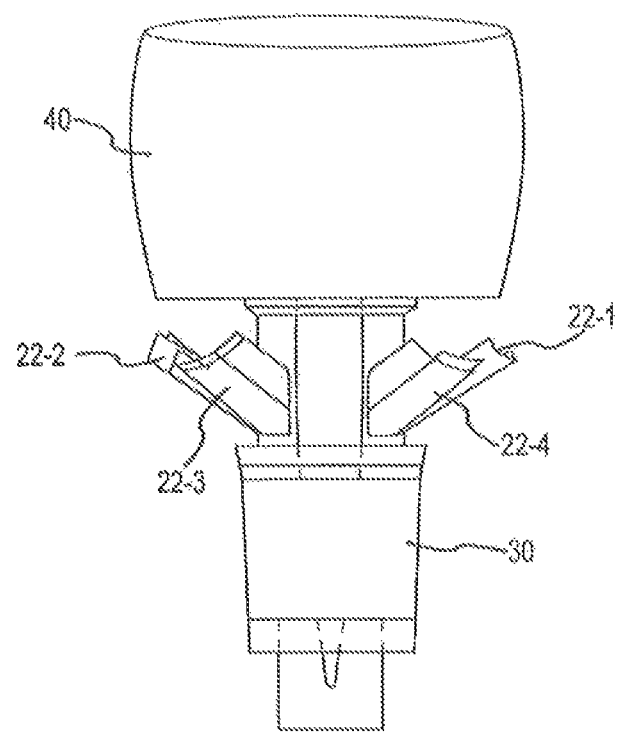
FIG. 6A illustrates a top view of a portion of aircraft propulsion system comprising a deployed thrust reverser, in accordance with various embodiments.
Figure 6B:
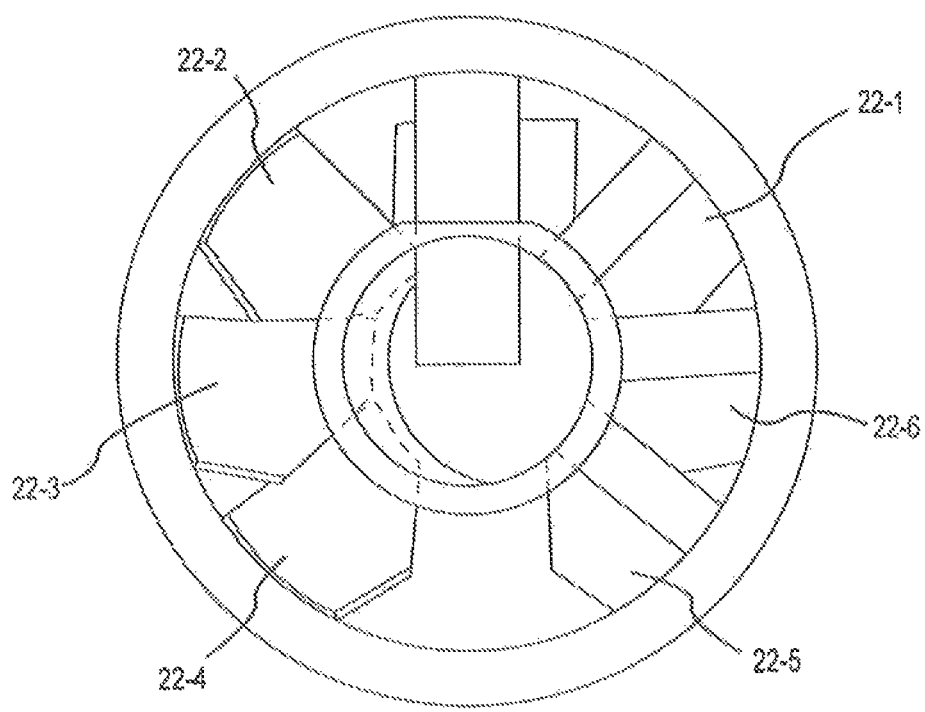
FIG. 6B illustrates a front view of a portion of aircraft propulsion system comprising a deployed thrust reverser, in accordance with various embodiments.
Figure 7A:
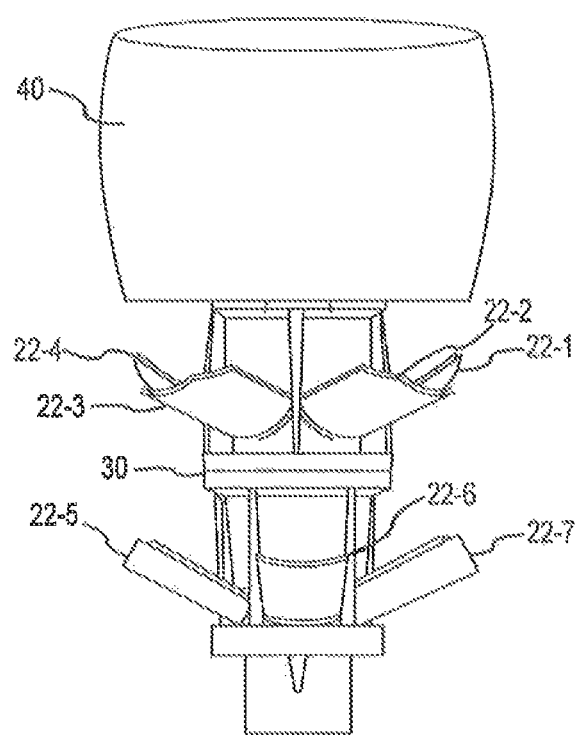
FIG. 7A illustrates a top view of a portion of aircraft propulsion system comprising a deployed thrust reverser, in accordance with various embodiments.

In various embodiments, and with reference to FIG. 6A-6B and 7A-7B, core cowl 30 and/or thrust reverser system 20 may comprise a plurality of thrust reverser systems and/or doors 22 (e.g., 22-1, 22-2, 2243, and 22-4 as shown in FIG. 6A and/or 22-1, 22-2, 22-3, and 22-4, 22-5, 22-6, and 22-7 as shown in FIG. 7A). Blockers doors 22 may be any suitable shape. Moreover, doors 22 of a thrust reverser system 20 may be different shapes depending on doors 22 various installation locations.

In various embodiments, the plurality of doors 22 may be installed around a single diameter of core cowl 30 (e.g., in a single cross-sectional plane of core cowl 30). In this regard, the hinge point of each door 22 may be installed at substantially the same distance from the inlet of fan cowl 40, as shown in FIG. 6A. The plurality of doors 22 may also be installed around various diameter of core cowl 30 (e.g., in various cross-sectional planes of core cowl 30). In this regard, the hinge points of a first portion of the plurality of doors 22 may be installed at first distance from the inlet of fan cowl 40 and the hinge points of a second portion of the plurality of doors 22 may be installed at second distance from the inlet of fan cowl 40, as shown in FIG. 7A.

Figure 7B:
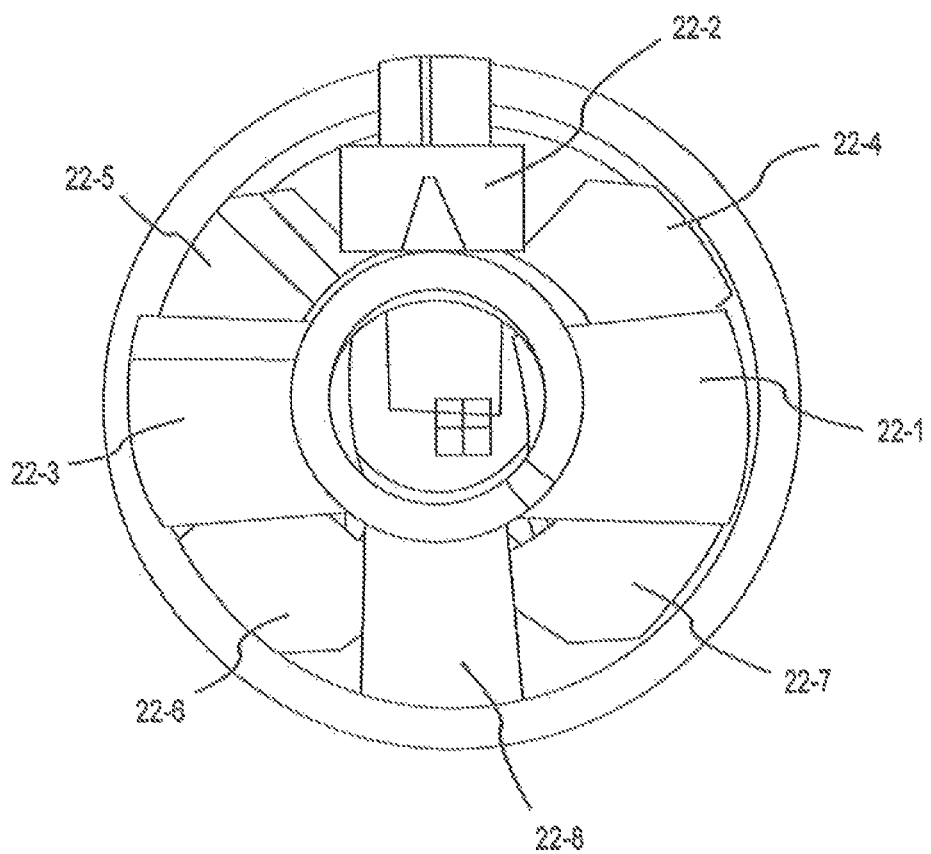
FIG. 7B illustrates a front view of a portion of aircraft propulsion system comprising a deployed thrust reverser, in accordance with various embodiments.

In various embodiments, this plurality of doors 22 may be configured to overlap and/or may be installed in an overlapping arrangement, as shown in FIGS. 6B and 7B. The overlap may occur where doors 22 are installed along a single diameter of core cowl 30, as shown in FIGS. 6A-6B. The overlap may occur where doors 22 are installed along multiple diameters of core cowl 30, as shown in FIGS. 7A-7B. The overlapping arrangement may be configured to and/or designed to minimize leakage past the doors 22. In this regard, doors 22 may be configured to create a larger reverse thrust, Doors 22 may also be designed and/or installed with sufficient area between the doors 22 to provide a designed leakage past the plurality of doors 22.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for," As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thrust reverser system, comprising:
a first door deployable from a core cowl, wherein the core cowl is disposed within a fan cowl, and wherein the core cowl and the fan cowl define a bypass air duct configured to allow an airflow between the core cowl and the fan cowl, and wherein the first door is disposed at a first distance from the fan cowl, and wherein the first door, when in a deployed state, obstructs the airflow exiting the bypass air duct and directed to the first door;
a second door disposed at a second distance from the fan cowl and circumferentially offset from the first door and deployable from the core cowl, wherein the second door is disposed downstream from the first door, and wherein the second door, when in a deployed state, extends radially outward from the core cowl and obstructs the airflow exiting the bypass air duct and directed to the second door; and
a first vane installed on the first door, wherein the first vane obstructs the airflow aft of the bypass air duct in response to the thrust reverser system being activated.

2. The thrust reverser system of claim 1, further comprising a second vane installed on the second door, wherein the second vane obstructs the airflow aft of the bypass air duct in response to the thrust reverser system being activated.

3. The thrust reverser system of claim 1, wherein a first edge of the second door overlaps a first portion of the first door in an axial direction, in response to the first door and the second door being deployed.

4. The thrust reverser system of claim 1, wherein the first door is deployed by an actuation mechanism.

5. The thrust reverser system of claim 1, further comprising a third door deployable from the core cowl and located aft of the first door, wherein the third door obstructs the airflow exiting the bypass air duct in response to the thrust reverser system being activated.

6. The thrust reverser system of claim 5, wherein a first end of the third door overlaps at least a second portion of the first door in an axial direction, in response to the first door and the third door being deployed.

7. The thrust reverser system of claim 5, wherein a first end of the third door overlaps at least a first portion of the first door and a second end of the third door overlaps at least a first edge of the second door in an axial direction, in response to the first door, the second door, and the third door being deployed.

8. The thrust reverser system of claim 1, wherein the first vane is configured to split an air flow from a fan.

9. A propulsion system, comprising:
a fan cowl;
a fan disposed within the fan cowl;
an engine core configured to drive the fan; and
a core cowl disposed within the fan cowl, wherein the core cowl is configured to surround at least a portion of the engine core, wherein the core cowl and the fan cowl define a bypass air duct configured to allow an airflow between the fan cowl and the core cowl, and
wherein the core cowl comprises:
a first door deployable from the core cowl and configured to obstruct the airflow exiting the bypass air duct in response to being deployed, and wherein the first door is disposed at a first distance from the fan cowl, and a second door deployable from the core cowl, wherein the second door extends radially outward from the core cowl to obstruct the airflow exiting the bypass air duct in response to being deployed, wherein the second door is disposed at a second distance from the fan cowl and is circumferentially offset and downstream from the first door, and wherein a first portion of the first door overlaps a first edge of the second door in an axial direction, in response to the first door and the second door being deployed.

10. The propulsion system of claim 9, wherein the first door comprises a vane.

11. The propulsion system of claim 10, wherein the vane is configured to direct the airflow aft the bypass air duct to create reverse thrust, in response to the first door being deployed.

12. The propulsion system of claim 9, wherein the first door comprises a first vane and the second door comprises a second vane.

13. The propulsion system of claim 12, wherein the first door and the second door are configured to obstruct the airflow in response to being deployed, and wherein the first vane and the second vane are configured to split and direct the airflow.

14. The propulsion system of claim 9, wherein the fan cowl comprises a variable area nozzle installed on an aft portion of the fan cowl.

15. The propulsion system of claim 14, wherein the variable area nozzle is configured to reduce the area of the bypass air duct to direct the airflow to the first door and the second door, in response to the first door being deployed.

16. A thrust reverser system, comprising:
a core cowl disposed within a fan cowl, wherein the core cowl and the fan cowl define a bypass air duct configured to allow an airflow between the core cowl and the fan cowl;
a first plurality of doors circumferentially displaced about a first radius of the core cowl, and configured to obstruct the airflow exiting the bypass air duct in response to being deployed; and
a second plurality of doors circumferentially displaced about a second radius of the core cowl downstream of the first radius, wherein the second plurality of doors extends radially outward from the core cowl to obstruct the airflow exiting the bypass air duct in response to being deployed, wherein the second plurality of doors are circumferentially offset from the first plurality of doors to minimize leakage of the thrust reverser system.

17. The thrust reverser system 16, wherein a door of the first plurality of doors comprises a vane.

18. The thrust reverser system 17, wherein the vane is configured to divert the airflow to create reverse thrust.

19. The thrust reverser system 16, wherein each of the first plurality of doors comprises a vane.

* * * * *